A. SHENFIELD.

Buckle for Suspenders.

No. 6,474. Reissued June 1, 1875.

Witnesses,

Chas H. Smith

Harold Sewell

Inventor

Abraham Shenfield per L. W. Sewell atty.

THE GRAPHIC CO. PHOTO-LITH. 39 & 41 PARK PLACE, N.Y.

UNITED STATES PATENT OFFICE.

ABRAHAM SHENFIELD, OF NEW YORK, N. Y.

IMPROVEMENT IN BUCKLES FOR SUSPENDERS.

Specification forming part of Letters Patent No. 112,857, dated March 21, 1871; reissue No. 6,474, dated June 1, 1875; application filed November 24, 1874.

*To all whom it may concern:*

Be it known that I, ABRAHAM SHENFIELD, of the city and State of New York, have invented and made a new and useful Improvement in Buckles for Suspenders, &c.; and the following is declared to be a correct description of the same.

Suspender buckles or clasps have been made with a swinging clamping-jaw to retain the strap. In these cases the clamping-jaw has either come at the back of the suspender or strap, and been inconvenient of access, or else the strap itself has come in front of the divided loops or suspender ends, and the clamp has been adjacent to an opening in the body of the buckle and pressed the suspender against one edge of that opening.

My invention is made to remove the objectionable features of the buckles before made by constructing the clamp so that it is operated at the outer side of the buckle, and the suspender-strap can pass down next the person, and behind the double loops or suspender ends, so that these can be freely unhooked from the buckle, and when the parts are in place on the person, the suspender-strap lies smooth and nearly straight against the person, and the ordinary loose end of the suspender is held back in place by the suspender ends coming on the outside thereof.

Figure 2:
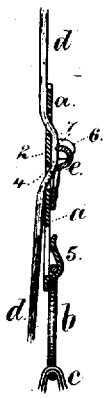
Figure 1:
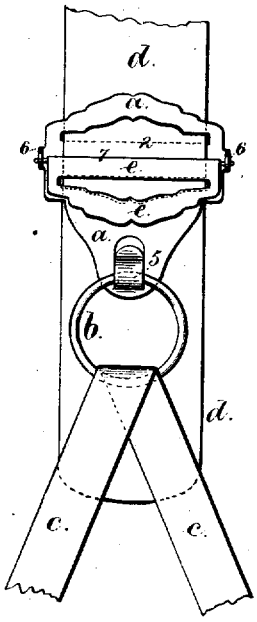
Figure 3:
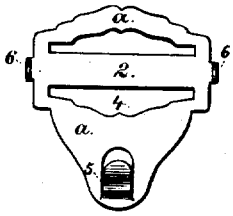
Figure 4:
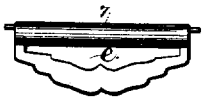

In the drawing, Figure 1 is an elevation of the buckle complete. Fig. 2 is a vertical section of the buckle and strap; and Figs. 3 and 4 show the two parts of the buckle separated.

The body *a* of the buckle is made more or less ornamental, and with a cross-bar, 2, and a hook, 5, for the ring *b* of the suspender ends *c c*, that can be unlocked from 5 when desired. The clamping portion *e* of the buckle is attached to the ears 6 6 on the edges of the body *a*, and the clamping-edge 7 acts to compress the strap *d* between the bar 2 and itself, and thereby hold said strap firmly. The suspender-strap *d* is inserted between the bar 2 and clamp *e*, and it may be passed through the opening 4, so that the parts of the buckle, except the bar 2, are in front of the said strap *d*. The clamp *e* can be turned up to release the suspender. The hook 5 and suspender ends *c* come outside the strap or suspender *d*, so that the latter can be next the person.

I claim as my invention—

The suspender-buckle, having the body *a*, bar 2, and hook 5 for the ring or attachment of the supender ends, and the opening for the suspender, in combination with the swinging clamp *e*, that is in front of, and connected with, the body *a*, substantially as set forth.

Signed by me this 18th day of November, A. D. 1874.

ABRAHAM SHENFIELD.

Witnesses:
GEO. T. PINCKNEY,
CHAS. H. SMITH.